Nov. 20, 1934.  E. R. EVANS  1,981,617
BRAKE LINKAGE
Filed Jan. 18, 1932
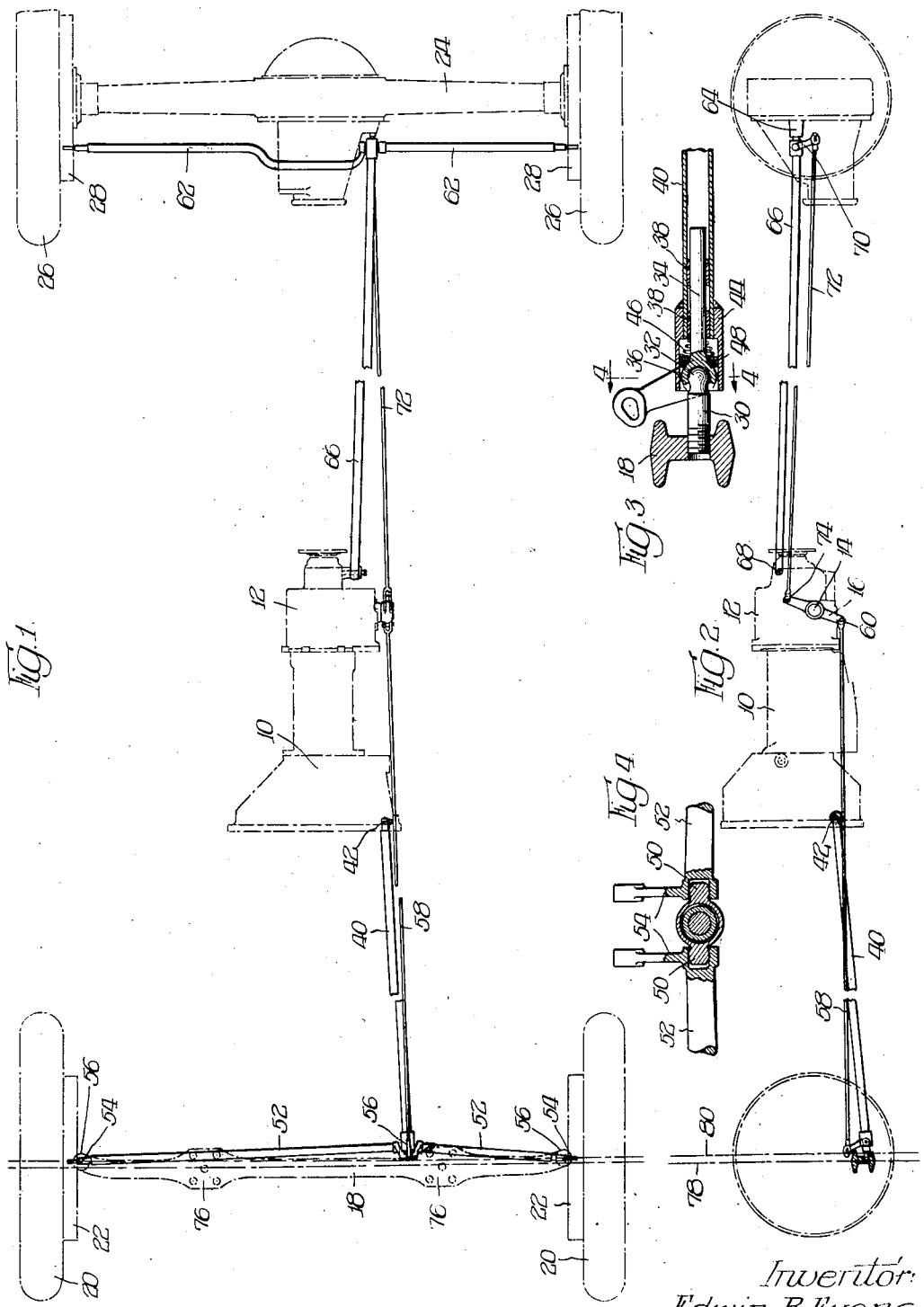
Inventor:
Edwin R. Evans Patented Nov. 20, 1934

1,981,617

UNITED STATES PATENT OFFICE 1,981,617

BRAKE LINKAGE

Edwin R. Evans, Chicago, Ill.

Application January 18, 1932, Serial No. 587,305

7 Claims. (Cl. 188—190)

This invention relates to improvements in brake linkage particularly adapted for motor vehicles including a mechanical power brake in the braking system.

The present invention is, in some respects, a modification of the improvements disclosed in my co-pending application, Serial No. 583,299, filed December 26, 1931, in which I have disclosed a brake linkage including brake linkage for actuating the four-wheel brakes of a motor vehicle including a mechanical power brake, the casing of which is rigid with the engine frame. I have pointed out in that application the desirability of compensating for such relative movement as may occur between the power brake casing which is rigid with the engine frame and which may be flexibly mounted on the vehicle chassis and the axles of the vehicle which support the pivots for the brake applying cross shafts. In that application I have shown cables connected between a double arm brake applying lever pivotally supported by the power brake casing and the front and rear brake cross shafts and flexible conduits receiving portions of the cables and extending between the pivotal supports for the cross shafts on the front and rear axles and points rigid with the engine frame and power brake casing. By this arrangement the bending of the cable conduits compensates for the movement of the power brake casing with respect to the axles and prevents variation in the proper distribution of the braking force to the front and rear brakes.

It is an object of the present invention to slidably support the pivots for the front and rear brake cross shafts upon the front and rear axles and to connect the slidable pivots by pivoted radius rods or tubes to points rigid with the engine frame and power brake casing whereby movement of the power brake casing relative to the axles will not cause any variation in the distribution of braking force to the front and rear brakes.

Further objects and advantages of the present improvements will be more readily apparent from the following description taken in connection with the attached drawing in which—

Figure 1 is a plan view of the brake linkage;

Figure 2 is a side elevation of the brake linkage;

Figure 3 is a detail section taken longitudinally through the radius rod connection to the front axle, and Figure 4 is a detail section taken on the plane indicated 4—4 in Figure 3.

10 indicates diagrammatically the transmission casing which is understood to be rigid with the engine frame and has integrally or rigidly secured thereto a power brake casing 12 which supports an output rock shaft 14 carrying a double arm brake lever 16. The front axle 18 shown diagrammatically supports, in the usual manner, the front wheels 20 and the front wheel brakes 22. In a similar manner there is shown a rear axle 24, rear wheels 26 and rear brakes 28.

The front axle 18 supports a pivot pin 30 extending transversely thereof in a horizontal plane and having a rounded outer end 32. A short rod 34 has a socket 36 receiving the rounded end 32 of the pin 30. The rod 34 has mounting thereon, through bearing sleeve 38, a relatively slidable radius rod or tube 40 pivoted at point 42 upon a part of the casing 10. The tube 40 has secured to its forward end a sleeve 44 fitting over the ball and socket connection between the pin 30 and the rod 34. A spring 46 reacts between sealing means 48 and the end of tube 40 to assist in holding the tube 40 in extended relation relative to the pivoted supporting rod 34. It will be understood that the axles will be maintained in normal position relative to the frame by the usual leaf springs and that the tube or radius rod 40 will move relative to the front axle together with the frame. The spring 46 merely assists in holding the parts in extended relation and to prevent rattle.

As shown in Figure 4 the sleeve 44 has oppositely disposed ball-shaped projections 50 which form pivotal supports for the inner ends of the front brake cross shafts 52, the outer ends 54 of which are supported by the cams (not shown) of the front brakes 22 beneath the swivel ends 56 of the front axle. The shafts 52 are free to swing through a limited amount relative to the supporting cams as disclosed in my application Serial No. 583,299, filed December 26, 1931. The shafts 52 have lever arms 54 rigid with their inner ends and are connected by a joint member 56 to a single cable 58 extending to a pivoted connection 60 with the lower end of the double arm brake lever 16.

The rear brake cross shafts 62 are supported in a similar manner upon the rear axle by the pin 64 and the pivoted radius rod or tube 66 which is pivotally connected at its forward end at 68 to a point rigid with the power brake casing 12. The rear brake cross shafts 62 have lever arms 70 connected by a single cable 72 to a pivot point 74 on the upwardly extending arm of the double arm brake lever 16.

It is further to be noted that the swivel ends 56 of the front axles 18 are bent rearwardly from the plane of the spring seat portions 76. The dotted line 78 in Figures 1 and 2 indicates the center line through the spring seats upon the axle, while the dotted line 80 indicates the center line of the swivel ends 56 of the front axle for mounting the front wheels 20. By displacing the vertical plane of the front wheel pivots upon the axle slightly rearwardly relative to the plane of the spring seat supports upon the axle, the loading of the vehicle initially stresses or winds up the springs since the load upon the vehicle tends to rotate the front axle in a counter-clockwise direction looking at the axle as in Figure 2. This initial stress upon the springs is in the same direction as the stress produced due to braking of the vehicle upon forward travel of the vehicle since the inertia or travel of the vehicle tends to throw the load forward of the vehicle and rotate the front axle in a counter-clockwise direction. It is therefore to be understood that the bending of the ends of the front axle 18 makes for improved riding conditions as well as permitting the use of straight cross shafts 52.

In operation, upon braking of the vehicle, should the pivot point 14 which is rigid with the power brake casing move either forwardly or rearwardly relative to the front and rear axles, the pivoted radius rods 40 and 66 would move the pivots for the front and rear brake cross shafts 52 and 62 in a similar manner and therefore the distribution of the braking pressure through operation of the brake applying lever 16 would be unchanged.

It will be understood that the mounting of the rear axle spring seats may be offset from the centers of the wheels in such a manner as to duplicate the deflection of the rear springs to the same or lesser degree than that in the front spring for the purpose of creating a steadying effect.

I claim:

1. Brake mechanism for motor vehicles comprising an axle, a wheel brake carried by said axle, a rock member for applying said wheel brake mechanism, a pivotal support for said rock member carried by said axle and relatively movable with respect thereto, a brake applying lever pivoted at a point rigid with the engine frame, a tension transmitting connection from said lever to said rock member and a radius member pivotally connected at one end to a point rigid with the engine frame and connected at the other end to the pivotal support for said rock member.

2. Brake mechanism for motor vehicles comprising an axle, a pair of wheel brakes carried by the ends of said axle, a pair of rock shafts for actuating said wheel brakes extending transversely of the vehicle, pivotal supports for the inner ends of said rock shafts slidably carried by said axle, a brake applying lever pivoted at a point rigid with the engine frame, a single tension transmitting connection between said lever and both of said rock shafts and a radius member pivotally connected at one end to a point rigid with the engine frame and connected at the other end to the pivotal supports for said rock shafts.

3. Brake mechanism for motor vehicles comprising an axle, wheel brakes carried by the ends of said axle, a pivot pin secured to said axle, a rod member pivotally connected to said pivot pin, a tube member slidably supported by said rod member at one end and pivotally connected at its opposite end to a point rigid with the engine frame, a pair of pivotal supports rigid with the end of said tube member which is pivotally and slidably supported with respect to the axle, a pair of brake actuating rock shafts supported at their inner ends by said pivot supports and extending transversely of the vehicle for actuating the wheel brakes, a pair of lever arms rigid with the inner ends of said rock shafts, a brake applying lever pivoted at a point rigid with the engine frame, and a cable connecting said brake lever to both of said lever arms.

4. Brake mechanism for motor vehicles comprising front and rear axles, a pair of front wheel brakes supported by the ends of said front axle, a pair of rear wheel brakes supported by the ends of said rear axle, a pair of brake actuating rock shafts for the front wheel brakes extending transversely of the vehicle, pivotal supporting means for the inner ends of said rock shafts slidably carried by the front axle, a pair of rear brake actuating cross shafts extending transversely of the vehicle, pivotal supporting means for the inner ends of said rear brake actuating cross shafts slidably supported by said rear axle, a double arm brake applying lever pivotally supported at a point rigid with the engine frame and members extending from the pivotal supports for the front and rear brake actuating rock shafts to pivot points rigid with the engine frame.

5. Brake mechanism for motor vehicles comprising a pair of axles, wheel brakes carried by said axles, a frame movable longitudinally of the vehicle relative to said axles, a brake applying lever pivoted on said frame, a plurality of brake actuating members, each of which is supported at one end by one of said wheel brakes and pivotally supported at its other end, cable connections from said lever to each of said brake actuating members and means for maintaining a substantially uniform distance between the pivot for said lever and the pivots for each of said brake actuating members throughout movement of said frame longitudinally of the vehicle relative to said axles.

6. Brake mechanism for motor vehicles comprising a pair of axles, wheel brakes carried by said axles, a frame movable longitudinally of the vehicle relative to said axles, a brake applying lever pivoted on said frame, a plurality of brake actuating members each of which is supported at one end by one of said wheel brakes and pivotally supported at its other end, cable connections from said lever to each of said brake actuating members and means for moving each of the pivots for said brake actuating members relative to said axles upon movement of said frame longitudinally of the vehicle in order to maintain a uniform distribution of braking pressure to the wheel brakes.

7. Brake mechanism for motor vehicles comprising a support, a wheel brake carried by said support, a rock member for applying said wheel brake, a pivotal support for said rock member carried by said first-mentioned support and relatively movable with respect thereto, a brake applying lever pivoted at a point rigid with the frame, a tension-transmitting member from said lever to said rock member and a radius member pivotally connected at one end to a point rigid with the engine frame and connected at the other end to the pivotal support for said rock member.

EDWIN R. EVANS.